Feb. 3, 1970   E. J. TASSET ET AL   3,493,247
FOLDABLE FRAME FOR AGRICULTURAL IMPLEMENTS
Filed Oct. 9, 1967   3 Sheets-Sheet 2

INVENTOR.
MICHAEL C. HORNUNG
EVERETT J. TASSET
BY
ATTORNEYS

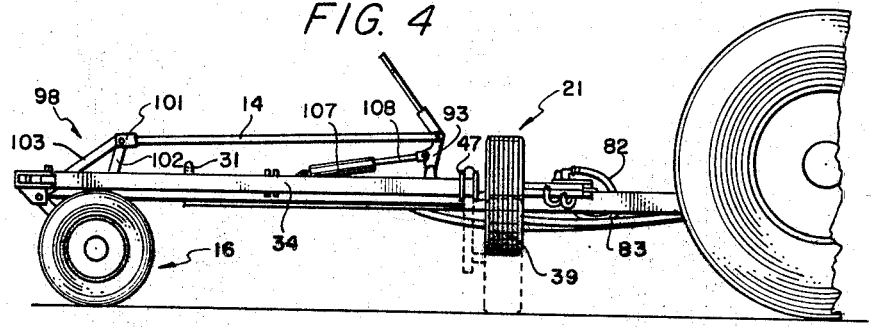
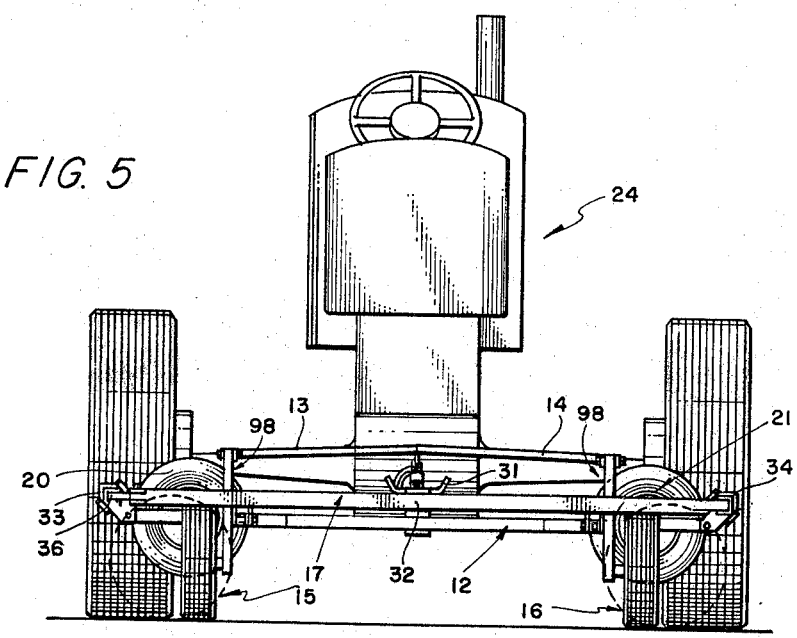
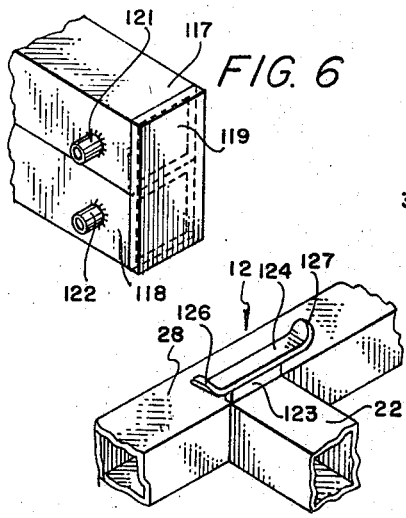
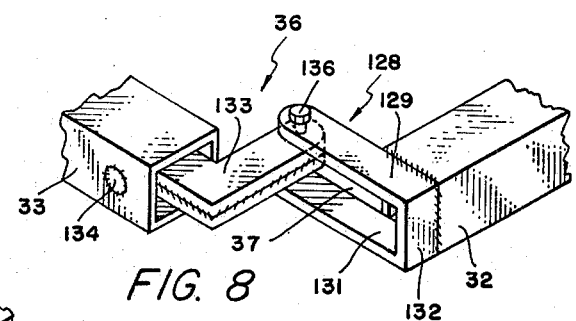
INVENTOR.
MICHAEL C. HORNUNG
EVERETT J. TASSET
BY
ATTORNEYS

United States Patent Office 3,493,247
Patented Feb. 3, 1970

3,493,247
FOLDABLE FRAME FOR AGRICULTURAL IMPLEMENTS
Everett J. Tasset and Michael C. Hornung, Spearville, Kans., assignors to American Products, Inc., Spearville, Kans.
Filed Oct. 9, 1967, Ser. No. 673,782
Int. Cl. B60d 1/08; B62d 53/00; A01b 63/10
U.S. Cl. 280—411                                    8 Claims

ABSTRACT OF THE DISCLOSURE

A foldable frame for agricultural implements is provided with a frame section and a foldable support beam connected to the frame section so as to transversely extend therefrom. The foldable support beam is provided with a plurality of hinges which allow transverse relative movement of the sections of the support beam thereby allowing the support beam to be folded in a forward position, when desired, and when in an extended working position allowing the sections of the support beam to rise and fall with variations of the surface of the ground and is supported by a wheel means connected to the end sections of the support beam. The foldable support beam is adapted to carry a farm implement, such as a grain drill and is pivotally connected at its end sections to a pair of extending forwardly converging folding link conduit means which, cooperating with said hinges of said support beam, allow the end sections of the foldable support beam to be folded in a forwardly direction. The folding link conduit means also provide wheel operating fluid communication between a fluid source and the wheel means of the foldable support beam. The end sections of the foldable support beam, and thus the implement mounted thereon are maintained horizontal with the central section of the support beam in both the folded and extended position.

---

This invention relates to implements. In one aspect it relates to a frame structure for a farm implement. In another aspect it relates to a foldable frame structure for a farm implement. In another aspect it relates to a forwardly foldable frame structure for a farm implement wherein the frame structure is provided with a frame section and a foldable support beam connected to the frame section so as to transversely extend therefrom. In another aspect it relates to a foldable frame structure for a farm implement wherein the foldable support beam is provided with a central section and opposing end sections pivotally connected to said central section thereby allowing said opposing end sections to be forwardly foldable. In another aspect it relates to a foldable frame structure for a farm implement wherein the pivotally connected opposing end sections of said foldable support beam are pivotally connected to a pair of folding link conduit means, said folding link conduit means and said opposing end sections of said foldable support beam cooperating to forwardly fold said opposing end sections and maintain same in a secured horizontal position.

In another aspect it relates to a foldable frame structure for a farm implement wherein the folding link conduit means function as fluid carrying conduits as well as support members thereby providing wheel operating fluid communication between a fluid supply source of a towing means and wheel activating means operatively connected to the end section of said foldable support beam.

Foldable frame structures for farm implements are desirable in order to work a large swath of ground in a single pass. However, the foldable frame structures of the prior art are undesirable for mounting certain equipment thereon, such as a grain drill, because the foldable frame structures of the prior art fold the end sections of the frame upwardly. Thus, a grain drill mounted on such a foldable frame structure must be emptied of its contents prior to folding the frame structure which is time consuming, or else the contents will be spilled when the frame is folded which is undesirable as it is wasteful and expensive.

Further, frame structures of the prior art are structurally complicated, requiring specifically designed connecting means and bracing means, and therefore, are rather expensive constructions. Further, these prior art frame structures do not provide for up and down relative movement of the end sections of the support beam and thus even depth of work of the implement and, at the same time, allow the unit to be folding in a forward manner.

Further, prior art structures suffer from the disadvantages of employing flexible hose members of great lengths to supply activating fluid from a fluid supply source carried by a tractor to remotely located activating means connected to rear portion of the frame structure for raising and lowering the frame structure. Due to the great length of flexible hose employed the hose is often punctured, especially by pinching of the hose during folding and thus a high degree of maintenance and care of the hose is required which results in frequent shut downs of the equipment.

Further, it is desirable to provide a lock means to secure the frame structure in a folded position which is relatively simple in construction, inexpensive and durable in construction so that the folded portion of the frame structure, and thus the farm implement are maintained in a stable position as the implement is moved from one location to another thus preventing damage to the frame structure.

According to the present invention a foldable frame means for an implement or the like is constructed having a frame structure adapted to be connected to a towing means. A sectional support beam adapted to carry the desired farm implement is provided with a central section and an end section pivotally connected to the central section. The central section of the sectional support beam is pivotally connected to the frame structure so that sectional support beam transversely extends therefrom. A first wheel means is pivotally connected to the frame structure and serves to raise and lower the frame structure and thus the sectional support beam. A second wheel means is pivotally connected to the end section of the support beam. A folding link conduit means is likewise provided which is pivotally connected at one end to the frame structure and pivotally connected at the other end to the end section of the sectional support beam, said folding link conduit means providing wheel operating fluid communication between a fluid source and the second wheel means. As the folding link means is folded inwardly towards the frame its movement causes the end section of the sectional support beam to be pivoted in a horizontal forwardly extending position with respect to the central section of the sectional support beam.

Further, according to the present invention, we have constructed a unique foldable frame structure which does not suffer from the above-mentioned disadvantages of the frame structures known to the prior art in that the end section of the support beam, and thus the equipment mounted thereon, such as a grain drill, is forwardly foldable and maintained in a horizontal position thus eliminating the necessity of removing the contents from the hopper of the grain drill prior to folding of the frame structure.

Further, according to the invention, a foldable frame structure which is relatively simple in design, sturdy, and relatively inexpensive is provided which compensates for the contour of the ground being worked by allowing up and down movement of the end section of the sectional support beam and thus the implement mounted thereon thereby assuring an even depth at which the ground is worked, and, at the same time, enables the end section to be forwardly folded as previously discussed.

Further according to the invention we have now discovered that by employing folding conduit link means as both the folding link support means for the end section of the sectional support beam, and thus the farm implement, and as the conduits for supplying activating fluid from a fluid supply source carried by a tractor to remotely located wheel activating means connected to the rear portion of the frame structure that maintenance problems of the prior art are readily eliminated.

Further according to the invention a lock means is provided which is relatively simple in construction, inexpensive, and durable which maintains the frame in a stable position when the end section of the foldable support beam is forwardly folded without the need for complex and expensive moving parts.

An object of the present invention is to provide a foldable frame means for a farm implement.

Another object of the invention is to provide a foldable frame means for a farm implement having a sectional support beam connected to the frame section and transversely extending therefrom wherein said sectional support beam is maintained in a horizontal position in the folded as well as extended position.

Another object of the invention is to provide a wheel means for supporting the end section of the sectional support beam which operates independently of a wheel means supporting the frame structure.

Another object of the invention is to provide a means for supplying activating fluid from a fluid supply source to wheel operating means carried by said wheel means for supporting the end section of said sectional support beam.

Another object of the invention is to provide a lock means mounted on the frame structure into which the folding link conduit means is stablized when the frame is in a forwardly folded position.

Another object of the invention is to provide a foldable frame structure wherein the folding link conduit means will ride over the frame structure and into position with the lock means when said folding link conduit means are moved inwardly and, at the same time, support the folding link conduit means by the frame structure, thus folding said frame without the need of auxiliary guide means.

Various other objects, advantages and features of the invention will become apparent to thoses killed in the art from a study of the drawings, the written description, and the appended claims.

Drawings accompany and are a part of this disclosure. These drawings depict preferred specific embodiments of the foldable frame structure of the invention, and it is to be understood that these drawings are not to unduly limit the scope of the invention. In the drawings, FIG. 1 is a top plan view of the foldable frame means of the present invention.

FIG. 4 is a side plan view of the apparatus of FIG. 3 wherein a second wheel means of the apparatus has been caused to be in a raised position thereby facilitating movement of the folded frame structure from location to location.

FIG. 5 is a rear plan view of the structure of FIG. 4.

FIG. 6 is a cross sectional view of the folding link conduit means of the present invention.

FIG. 7 is a sectional top plan view of the frame structure having the lock means mounted thereto for securing the folding link conduit means in a relatively fixed position when positioned therein.

FIG. 8 is a fragmentary enlarged perspective view of a hinge element for coupling sections of a sectional support beam of the frame structure of the present invention.

Figure 1:
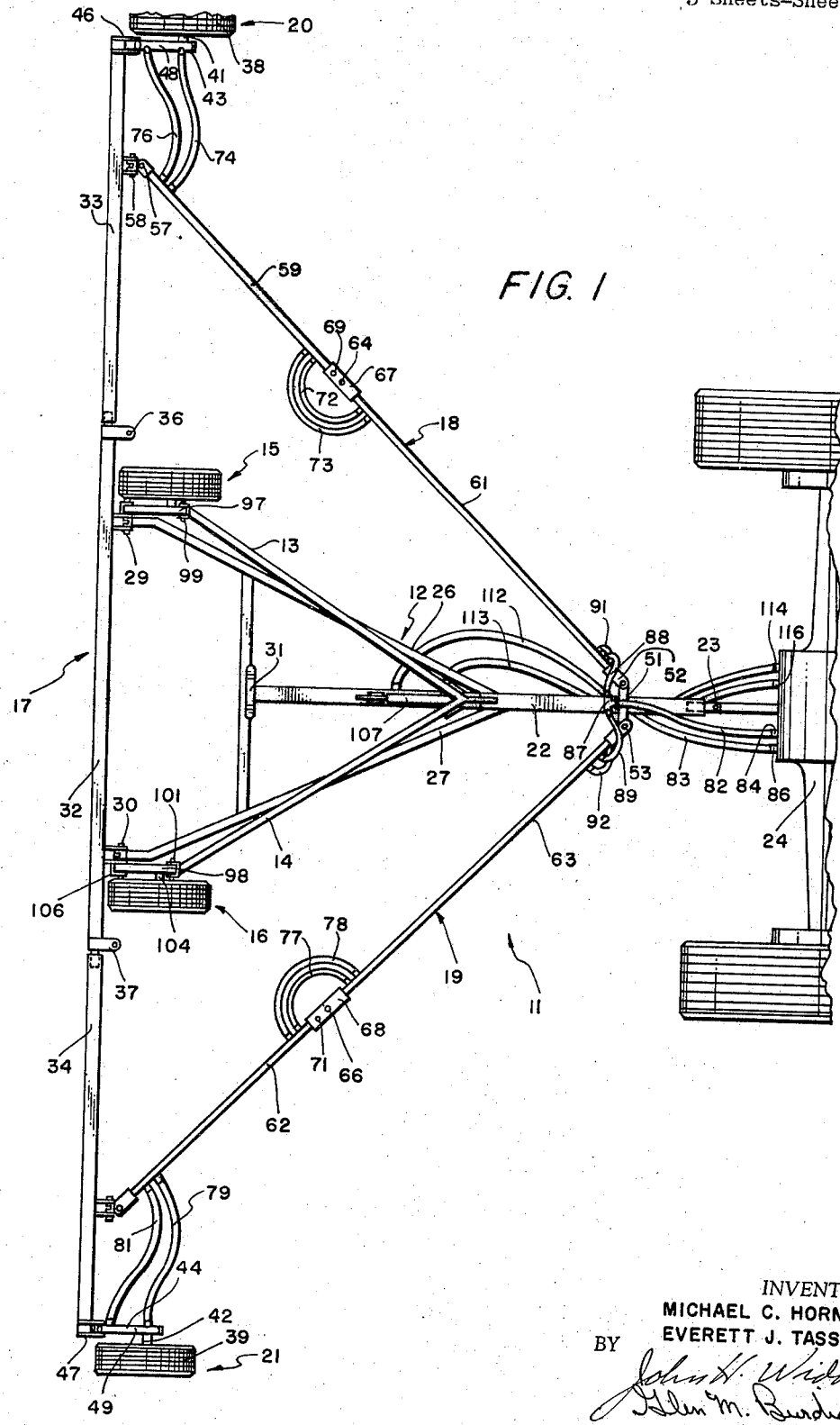

In the following is a discussion and description of the invention made with reference to the drawings whereupon the same reference numerals are used to indicate the same or similar parts and/or structure. The discussion and description is of preferred specific embodiments of the new foldable frame means of the invention, and it is to be understood that the discussion and description is not to unduly limit the scope of the invention.

Figure 2:
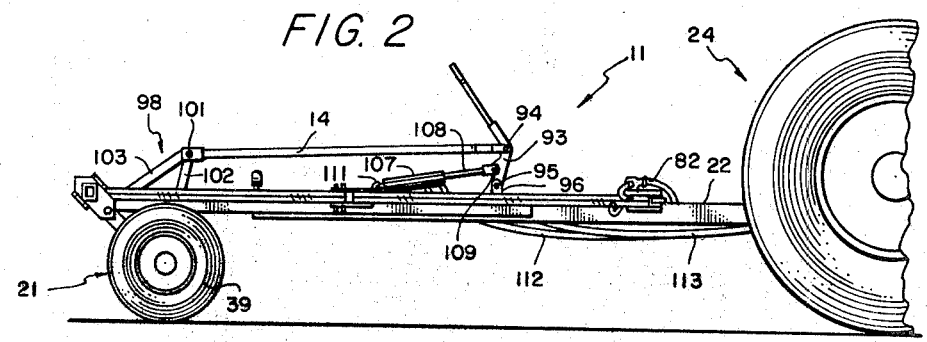
FIG. 2 is a side plan view of the foldable frame structure of FIG. 1.

Referring now to the drawings, and particularly to FIGS. 1 and 2, a frame structure for farm implements, generally designated by numeral 11 is shown. Frame structure 11 is provided with a generally horizontally disposed A-shaped frame means 12, a pair of forwardly converging elongated members 13 and 14, a first pair of wheel means 15 and 16, a sectional support beam 17, a pair of forwardly converging folding link conduit means 18 and 19, and a second pair of wheel means 20 and 21.

A-shaped frame means 12 is provided with tongue member 22 having an aperture 23 in its forward end portion for connecting the frame structure 11 to a tractor 24, and the like. A-shaped frame means 12 is likewise provided with forwardly converging elongated members 26 and 27 secured to tongue member 22 and connected rearwardly therefrom by cross member 28, which is also connected to tongue member 22. The rearwardmost ends of elongated members 26 and 27 are pivotally connected to sectional support beam 17 by clamp means 29 and 30 thereby connecting sectional support beam 17 to A-shaped frame means 12 so that sectional support beam 17 transversely extends therefrom. Lock means 31, which will be discussed in more detail hereinafter, is mounted intermediately on cross member 28 at a point adjacent tongue member 22 where cross member 28 and tongue member 22 are joined.

Sectional support beam 17 is provided with a central section 32 having opposed end sections 33 and 34 pivotally connected to central section 32 by a plurality of hinge means 36 and 37. Central section 32, and opposed end sections 33 and 34 are preferably formed of a square-shaped or rectangular tubing material and positioned so that central section 32 and opposed end sections 33 and 34 can be aligned, through hinge means 36 and 37, or opposed end sections 33 and 34 can be forwardly folded with respect to central section 32 at hinge means 36 and 37 (see FIG. 3). Opposed end sections 33 and 34 of sectional support beam 17 are held in elevated position by second pair of wheel means 20 and 21. Second pear of wheel means 20 and 21 are provided with wheels 38 and 39 positioned at the outer end portion of opposed end sections 33 and 34, respectively. Wheels 38 and 39 are operatively connected to axial spindles 41 and 42 which are connected to and supported from arms 43 and 44 depending from brackets 46 and 47 which in turn are secured to opposed end sections 33 and 34 of sectional support beam 17 by any suitable means such as welding, clamping, bolting, and the like. Cylinder and piston means, such as hydraulic cylinders 48 and 49, are mounted on arms 43 and 44, respectively, and are operatively connected to opposed end sections 33 and 34 so that upon activation of hydraulic cylinders 48 and 49 wheels 38 and 39 are caused to be raised and lowered in response thereto.

Figure 3:
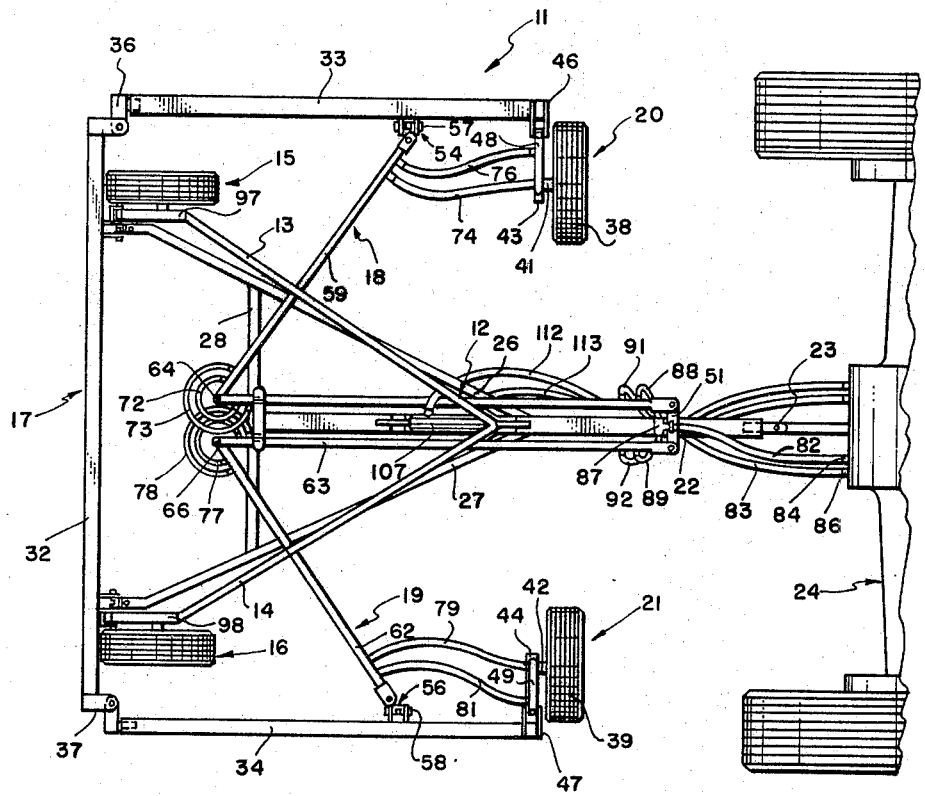
FIG. 3 is a top plan view of the foldable frame structure of the present invention wherein the structure is in a folded position.

Forwardly converging folding link conduit means 18 and 19 are pivotally connected at the forwardly extending portion of tongue member 22 of A-shaped frame means 12 by support means 51 and hinge elements 52 and 53. Support means 51 is connected to tongue member 22 by any suitable means such as welding, bolting, and the like. Folding link conduit means 18 and 19 are pivotally connected at their rearwardmost ends to opposed end sections 33 and 34 of sectional support beam 17, respectively, by knuckle means 54 and 56, and pin elements 57 and 58. Folding link conduit means 18 is provided with two fluid-tight conduit members 59 and 61 and folding link conduit means 19 is likewise provided with two fluid-tight conduit members 62 and 63. Fluid-tight conduit members 59 and 61 are pivotally connected at their adjacent ends by hinge means 64 and fluid-tight conduit members 62 and 63 are likewise pivotally connected at their adjacent ends by hinge means 66. As can readily be seen in FIG. 1, fluid-tight conduit members 59 and 61 of folding link conduit means 18 can be maintained in an aligned position as can fluid-tight conduit members 62 and 63 of folding link conduit means 19, or in a folded position as shown in FIG. 3. Plate elements 67 and 68 are mounted on folding link conduit means 18 and 19 respectively so that when fluid-tight conduit members 59 and 61 of folding link conduit means 18 and fluid-tight conduit members 62 and 63 of folding link conduit means 19 are aligned, pin elements 69 and 71 can be inserted within plate elements 67 and 68 and fluid-tight conduit members 61 and 63 respectively thereby maintaining folding link conduit means 18 and 19 in a relatively fixed position. When it is desirable to fold frame structure 11 pin elements 69 and 71 are removed from plate elements 67 and 68 and thus fluid-tight conduit members 61 and 63, respectively, and folding link conduit means 18 and 19 are moved inwardly over A-frame means 12 and positioned within lock means 31. When folding link conduit means 18 and 19 are positioned within lock means 31 they are also supported by forwardly converging elongated members 26 and 27, respectively, of A-shape frame means 12. Upon causing folding link conduit means 18 and 19 to be moved inwardly opposed end sections 33 and 34 of sectional support beam 17 are caused to be moved in a forwardly extending direction with respect to central section 32 of sectional support beam 17. Due to the unique design of hinge means 36 and 37 opposed end sections 33 and 34 of sectional support beam 17 remain in a horizontal position when in the extended position and when in the folded position.

A plurality of flexible conduit means, such as hose members 72 and 73 are connected to adjacent end portions of fluid-tight conduit members 59 and 61 of folding link conduit means 18 so that fluid-tight conduit members 59 and 61 are in a fluid communication with each other. A second flexible conduit means, such as hose members 74 and 76, is connected to the rearwardly extending portion of folding link conduit means 18 at one end and to hydraulic cylinder 48 carried by arm 43 of wheel means 20 at the other end thus providing fluid communication between folding link conduit means 18 and hydraulic cylinder 48. Likewise, a plurality of flexible conduit means, such as hose members 77 and 78 are connected to adjacent end portions of fluid-tight conduit members 62 and 63 of folding link conduit means 19 so that fluid-tight conduit members 62 and 63 are in fluid communication with each other. Hose members 79 and 81 are connected to the rearwardly extending portion of folding link conduit means 19 at one end and to hydraulic cylinder 49 carried by arm 44 of wheel means 21 at the other end thus providing fluid communication between folding link conduit means 19 and hydraulic cylinder 49. A third flexible conduit means, such as hoses 82 and 83, are connected at one end to connector means 84 and 86 mounted on tractor 24 which in turn are connected to a fluid supply source (not shown). The other end of hoses 82 and 83 are connected to two coupling T-members such as indicated by 87. As illustrated in FIG. 1, coupling T-member 87 is shown connected to hose 82. Flexible conduits, such as hoses 88 and 89 are connected to coupling T-members 87 at one end and to the forwardly converging end portions of folding link conduit means 18 and 19, respectively, thereby providing fluid communication between the fluid supply source, folding link conduit means 18 and 19 and thus hydraulic cylinders 48 and 49 of wheel means 20 and 21, respectively. A second coupling T-member (not shown) is likewise connected to hose 83 and flexible conduits, such as hoses 91 and 92, are connected to the second coupling T-member at one end and to the forwardly converging end portions of folding link conduit means 18 and 19, respectively, thereby providing fluid communication between the fluid supply source, folding link conduit means 18 and 19 and thus hydraulic cylinders 48 and 49 of wheel means 20 and 21, respectively.

Referring more specifically to FIG. 2, forwardly converging elongated member 14 is pivotally connected at its forwardmost extending end portion to linkage member 93 by any suitable means, such as pin element 94. Linkage member 93 is then connected to couple member 96 by pin element 97 which allows linkage member 93 to be moved in a back and forth direction. Coupling member 96 is then connected to tongue member 22 of A-shaped frame means 12. The rearwardly extending end portion of elongated member 14 is pivotally connected to coupling means 98 by pin element 101. Coupling means 98 is provided with leg members 102 and 103. Leg member 102 is pivotally connected to axial spindle 104 of wheel means 16 and leg member 103 to clamp means 106 which in turn is mounted on clamp means 30 which is connected to central section 32 of sectional support beam 17. As can clearly be seen in FIG. 2, elongated member 14 and thus elongated member 13 (not shown) are maintained above and in a spaced relationship with A-shaped frame means 12 by coupling means 97 (not shown) and 98, linkage member 93, and couple member 96 mounted on A-shaped frame means 12.

Cylinder and piston means, such as a pneumatic cylinder or hydraulic cylinder 107, is provided with shaft member 108 which is pivotally connected at one end to linkage member 93 by pin element 109. Hydraulic cylinder 107 is then mounted on tongue member 22 of A-shaped frame means 12 by any suitable means such as bracket and pin 111 and the like. A plurality of fluid conducting means, such as hoses 112 and 113, are operatively connected to hydraulic cylinder 107 at one end and to connector means 114 and 116 of tractor 24 at the other end. Connector means 114 and 116 are in turn in fluid communication with a fluid source (not shown) carried by tractor 24.

Referring now to FIG. 3, frame structure 11 is depicted in a folded position to facilitate transportation of frame structure 11 from one location to another and through restricted areas such as gates and the like. For the sake of simplicity, the activating means for raising second wheel means 20 and 21 will be discussed as a hydraulic system. However, any other system, such as a pneumatic system, is within the scope and disclosure of the invention. In order to describe frame structure 11 as shown in the folded position, the operative steps necessary to position frame structure 11 is an extended working position, as shown in FIG. 1, from a folded position, as shown in FIGS. 2, 4 and 5 will be discussed.

Frame structure 11 is connected to tractor 24 and is transported in the folded position to the field to be worked. As can clearly be seen wheel means 20 and 21 are positioned in a raised position and wheel means 15 and 16 are in a lowered position during transportation of the implement from one location to another. An important advantage of the present invention can readily be seen in FIGS. 4 and 5, namely, the forwardly foldable opposed end sections 33 and 34 of sectional support beam 17 remain in a horizontal position when in the folded position. When it is desirable to unfold the frame structure 11 and position it in the extended working position an activator switch or lever, operatively connected to the fluid supply source on tractor 24, is operated thereby providing activating fluid to hydraulic cylinders 48 and 49 of second wheel means 20 and 21 through hoses 82 and 83, folding link conduit means 18 and 19, and hoses 74, 76, 79 and 81. As can readily be seen wheel means 20 and 21 operate from the same fluid source and at the same pressure, but independently of each other. Once wheel means 20 and 21 are positioned in their downwardly extended position one of the folding link conduit means, such as folding link conduit means 18 is removed from lock means 31 and opposed end section 33 of sectional support beam 17 is moved in a rearwardly direction pivoting at hinge means 36. When opposed end sections 33 are in an aligned position with central section 32 of support beam 17 conduits 59 and 61 of folding link conduit means 18 are also aligned with each other. Pin element 69 is then inserted within plate element 67 and conduit 61 thereby securing conduits 59 and 61 of folding link conduit means 18 in a relatively fixed position. The same procedure is then followed to align opposed end section 34 of sectional support beam 17 with opposed end section 33 and central section 32. Sectional support 17 is now in the extended working position as shown in FIG. 1, but sectional support beam 17 and thus the implement attached thereto are in a raised position and maintained there by first wheel means 15 and 16. In order to lower sectional support beam 17 and thus the implement attached thereto hydraulic cylinder 107 carried by A-shaped frame means 12 is activated by a lever or selector switch or tractor 24. As hydraulic cylinder 107 is activated shaft 108 of hydraulic cylinder 107 is retracted and forwardly elongated members 13 and 14 pivotally connected to the forward end of shaft through linkage member 93 are caused to be moved in a rearward direction. The rearwardly extending end portions of forwardly converging elongated members 13 and 14 are pivotally connected to coupling means 97 and 98 respectively, which in turn are pivotally connected to first wheel means 15 and 16 and clamp means 106 which is mounted on clamp means 29 and 30 connected to central section 32 of sectional support beam 17. As elongated members 13 and 14 are moved rearwardly the upper portion of coupling means 97 and 98 are likewise moved rearwardly thus moving the lower portion of coupling means 97 and 98 which are connected to first wheel means 15 and 16 in a forward upwardly extending direction and at the same time lowering sectional support beam 17 and thus the implement connected thereto into the desired working position. As is clearly evident from the above description first wheel means 15 and 16 and second wheel means 20 and 21 are operated independently of each other.

In the remaining description of the drawings only one element of a plurality of similar elements will be described for the sake of simplicity. Referring now to FIG. 6, conduit members 59 and 61 of folding link conduit means 18 are illustrated in detail. Conduit members 59 and 61 are fluid-tight conduit members formed of two square shaped tubular members 117 and 118 having their ends sealed by any suitable means such as plate member 119 welded thereto. Tubular members 117 and 118 are secured together along their longitudinal axis by any suitable means such as welding, clamping and the like. Tubular members 117 and 118 are provided with connector means 121 and 122 which are in fluid communication with the interior of square-shaped tubular members 117 and 118 respectively, and connector means 121 and 122 are connected to the various hose members as previously discussed.

Referring now to FIG. 7, lock means 31 is shown mounted on cross member 28 of A-shaped frame means 12 and adjacent tongue member 22. Locking means 31 is provided with a base member 123 carried by cross member 28. A clip means 124 having end portions 126 and 127 which are provided with an upwardly sloping curvature is mounted on base member 123 intermediate end portions 126 and 127 and thus maintaining end portions 126 and 127 in a parallel spaced relationship with cross members 28. As folding link conduit means 18 (see FIG. 1) is caused to be moved to a folded position fluid-tight conduit members 59 and 61 of folding link conduit means 18 are caused to rise over forwardly converging elongated member 26 of A-shaped frame means 12 and conduit member 61 contacts lock means 31 and is inserted within. When conduit member 61 is positioned within lock means 31 conduit member 59 is caused to rest on forwardly converging elongated member 26 and be supported thereby. The upward sloping curvature of end portions 126 and 127 of clip means 124 guide conduit member 61 of folding link means 18 thereby causing conduit member 61 to enter the space created between clip means 124 and cross member 28. As conduit member 61 is guided therein it is maintained therein thereby preventing up and down movement of conduit member 61 thus maintaining the same in a relatively fixed position.

FIG. 8 depicts hinge means 36 which allows opposed end section 33 of sectional support beam 17 to be moved in a forwardly direction with respect to central section 32 of sectional support beam 17 and, at the same time, maintain both opposed end sections 33 and central section 32 in a horizontal position. Hinge means 36 is provided with a yoke member 128 which is here shown as a U-shaped member having two parallel leg members 129 and 131 maintained in a spaced relationship with each other by base member 132 connected to one end of each of leg members 129 and 131. Central section 32 of sectional support beam 17 is connected to U-shaped yoke member 128 so that base member and a portion of leg members 129 and 131 of yoke member 128 abut one end of central section 32. Opposed end section 33 of sectional support beam 17 is provided with axially aligned openings in its end adjacent yoke member 128 and the axially aligned openings of opposed end section 33 are positioned in a plane perpendicular to the axially aligned opening within leg members 129 and 131 of yoke member 128. A generally L-shaped body means 133 is pivotally connected to opposed end section 33 of sectional support beam 17 by pin element 134 and to yoke member 128 by pin element 136. Opposed end section 34 is likewise connected to the other end of central section 32 of sectional support beam by another of hinge means 36.

The foregoing discussion and description has been made in connection with preferred specific embodiments of the foldable frame structure of the invention. However, it is to be understood that the discussion and description is only intended to illustrate and teach those skilled in the art how to practice the invention.

We claim:
1. A foldable frame means for an implement or the like comprising:
   (a) a frame structure adapted to be connected to a towing means;
   (b) a first wheel means pivotally connected to said frame structure;
   (c) a sectional support beam provided with a central section and an end section pivotally connected to said central section, said central section being pivotally connected to said frame structure and transversely extending therefrom;
   (d) a second wheel means pivotally connected to said end section of said support beam; and
   (e) a folding link conduit means having one end pivotally connected to said frame structure and the other end pivotally connected to said end section of said end section of said sectional support beam, said folding link conduit means being hollow and internally providing wheel operating fluid communication between a fluid source and a means to elevate said second wheel means,
      said frame structure, said folding link conduit means and said end section of said sectional support being constructed and connected as above so that said end section is pivoted in a horizontal forward direction with respect to said central section of said sectional support beam when said frame means is in a folded position.
2. The foldable frame means according to claim 1 wherein said frame structure is a generally horizontally disposed A-shaped frame means provided with a tongue member and said first wheel means is pivotally connected to said A-shaped frame means to support said A-shaped frame means.

3. The foldable frame means according to claim 2 to include a cylinder and piston means mounted on said tongue member of said A-shaped frame means and pivotally connected to a pair of forwardly converging elongated members at their forwardmost end portions, said forwardly converging elongated members being pivotally connected to said first wheel means at their rearwardmost end positions and said elongated members being maintained in a spaced relationship above said A-shaped frame means.

4. The foldable frame structure according to claim 1, which includes a lock means mounted on said frame structure, said lock means being adapted to maintain said folding link conduit means within said lock means when said folding link conduit means is in a folded position thereby preventing up and down movement of said folding link conduit means.

5. The foldable frame structure according to claim 1 wherein said second wheel means is provided with a cylinder and piston means connected to said second wheel means, said cylinder and piston means being in fluid communication with a fluid source carried by said tractor via said folding link conduit means and operating in response to fluid from said fluid source.

6. The foldable frame structure according to claim 1 wherein said folding link conduit means comprises:
 (a) a first conduit member having its ends enclosed, said first conduit members having two passageways extending therethrough and having an inlet and outlet in each of said passageways near their extremities,
 (b) a second conduit member having its ends enclosed, said second conduit member having two passageways extending therethrough and having an inlet and outlet in each of said passageways near their extremities,
 (c) a hinge means positioned between adjacent ends of said first and second conduit members and connected thereto, said hinge means being provided with a plate element connected to said first conduit receiving a locking pin for maintaining said first and second conduit members in a rigid aligned position when said locking pin is positioned within said plate element,
 (d) a first pair of flexible conduit members connected to the outlets of said first conduit member and to the inlets in the adjacent end of said second conduit member,
 (e) a second pair of flexible conduit members connected to the outlets of said second conduit member and operatively connected to a cylinder and piston means connected to said second wheel means,
 (f) a third pair of flexible conduit members connected to the inlets of said first conduit member and to a fluid source carried by a tractor, thereby maintaining a wheel operating fluid communication between said fluid source and said cylindrical piston means of said second wheel means.

7. The frame structure according to claim 1 which comprises:
 (a) generally horizontally disposed A-shaped frame means provided with a tongue member,
 (b) said first wheel means pivotally connected to said A-shaped frame means to support said A-shaped frame means,
 (c) a cylinder and piston means mounted on said tongue means,
 (d) a pair of forwardly conveying elongated members positioned in a spaced relationship above said A-shaped frame means and pivotally connected to said cylinder and piston means at their forwardmost end portions and to said central section of said sectional support beam at their rearwardly extending ends,
 (e) said second wheel means pivotally connected to said opposed end sections of said section support beam, said second wheel means having a second cylinder and piston means for raising and lowering said second wheel means in response thereto, said second cylinder and piston means operating independently of said first cylinder and piston means,
 (f) a plurality of folding link members forming a first conduit member having its ends enclosed, said first conduit members having two passageways extended therethrough and having an inlet and outlet in each of said passageways near their extremities, a second conduit member having its ends enclosed, said second conduit member having two passageways extending therethrough and having an inlet and outlet in each of said passageways near their extremities a hinge means positioned between adjacent ends of said first and second conduit members and connected thereto, and hinge means being provided with a plate element connected to said free conduit receiving a locking pin for maintaining said first and second conduit members in a rigid aligned position when said locking pin is positioned within said plate element,
  a first pair of flexible conduit members connected to the outlets of said first conduit member and to the inlets of said second conduit members,
  a second pair of flexible conduit members connected to the outlets of said second conduit members and operatively connected to a cylinder and piston means connected to a second wheel means, and connected to said opposing end sections of said sectional support beam,
  a third pair of flexible conduit members connected to the inlets of said first conduit members and to a fluid source carried by said tractor, thereby maintaining a fluid communication between said fluid source and said cylindrical piston means of said second wheel means; and
 (g) a lock means having a base portion, mounted centrally on said A-shaped frame means and a clip means having an upwardly sloping curvature on its end portion connected to said base portions, said clip means being positioned in a spaced relationship with said A-shaped frame means thereby allowing said folding link means to be positioned therein when said folding link means are moved inwardly toward said lock means.

8. A foldable frame means for an implement or the like comprising:
 (a) a frame structure adapted to be connected to a towing means;
 (b) a first wheel means pivotally connected to said frame structure;
 (c) a sectional support beam provided with a central section and an end section pivotally connected to said central section, said central section being pivotally connected to said frame structure and transversely extending therefrom;
 (d) a second wheel means pivotally connected to said end section of said support beam;
 (e) a folding link conduit means having one end pivotally connected to said frame structure and the other end pivotally connected to said end section of said end section of said sectional support beam;
 (f) means to flow fluid from a fluid source internally through said folding link conduit means; and
 (g) means operable by said fluid to vertically move said second wheel means from a ground-engaging position to a raised position, said frame structure, said folding link conduit means and said end section of said sectional support being constructed and connected as above so that said end section is pivoted in a horizontal forward direction with respect to said central section of said sectional support beam when said frame means is in a folded position.

References Cited

UNITED STATES PATENTS

| | | | |
|---|---|---|---|
| 2,641,886 | 6/1963 | Graham | 172—311 |
| 3,180,429 | 4/1965 | Perhink | 172—456 |
| 3,190,367 | 6/1965 | Kopaska | 172—456 |
| 3,243,201 | 3/1966 | Bock | 280—421 |
| 3,288,480 | 11/1966 | Calkins et al. | 172—456 |
| 3,414,064 | 12/1968 | Foster | 172—311 |

LEO FRIAGLIA, Primary Examiner

U.S. Cl. X.R.

172—456; 280—421